US011113185B2

(12) United States Patent
Sandhu et al.

(10) Patent No.: US 11,113,185 B2
(45) Date of Patent: Sep. 7, 2021

(54) AUTOMATED CODE TESTING FOR CODE DEPLOYMENT PIPELINE BASED ON RISK DETERMINATION

(71) Applicant: Adobe Inc., San Jose, CA (US)

(72) Inventors: Harinder Singh Sandhu, Crescent (GB); Adrian John O'Lenskie, Dunblane (GB)

(73) Assignee: Adobe Inc., San Jose, CA (US)

( * ) Notice: Subject to any disclaimer, the term of this patent is extended or adjusted under 35 U.S.C. 154(b) by 16 days.

(21) Appl. No.: 16/679,971

(22) Filed: Nov. 11, 2019

(65) Prior Publication Data

US 2021/0141718 A1    May 13, 2021

(51) Int. Cl.
*G06F 8/60* (2018.01)
*G06F 11/36* (2006.01)

(52) U.S. Cl.
CPC ............ *G06F 11/3688* (2013.01); *G06F 8/60* (2013.01); *G06F 11/3616* (2013.01)

(58) Field of Classification Search
CPC .... G06F 11/3688; G06F 11/3672; G06F 8/60; G06F 2221/033; G06F 11/3616
See application file for complete search history.

(56) References Cited

U.S. PATENT DOCUMENTS

| | | | |
|---|---|---|---|
| 7,506,312 B1* | 3/2009 | Girolami-Rose | G06F 8/71 717/101 |
| 9,921,942 B1* | 3/2018 | Makohon | G06F 11/3672 |
| 10,817,283 B1* | 10/2020 | Naik | G06Q 10/103 |
| 2017/0091078 A1* | 3/2017 | Atyam | G06F 11/3672 |
| 2018/0293158 A1* | 10/2018 | Baughman | G06F 8/77 |
| 2019/0227902 A1* | 7/2019 | Cheng | G06F 8/71 |
| 2019/0294528 A1* | 9/2019 | Avisror | G06F 8/60 |
| 2019/0294531 A1* | 9/2019 | Avisror | G06F 11/3676 |
| 2019/0303116 A1* | 10/2019 | Ding | G06F 8/33 |
| 2021/0019249 A1* | 1/2021 | Gnaneswaran | G06F 11/3612 |

* cited by examiner

*Primary Examiner* — Wei Y Zhen
*Assistant Examiner* — Amir Soltanzadeh
(74) *Attorney, Agent, or Firm* — FIG. 1 Patents

(57) ABSTRACT

Software code is written using a multistage automated code deployment pipeline. A code change is provided to the pipeline and at each stage various checks or evaluations of the code change is performed. Additionally, a risk profile is generated for the code change that identifies a risk of making the code change based on the code change itself as well as a reputation of the individual providing the code change. In one or more stages of the pipeline, a determination is made whether the risk profile meets a verification criteria, and if so the code change does not progress to the next stage in the pipeline until additional verification (in addition to any testing typically performed at that stage) is performed.

20 Claims, 8 Drawing Sheets

AUTOMATED CODE TESTING FOR CODE DEPLOYMENT PIPELINE BASED ON RISK DETERMINATION

BACKGROUND

Companies and individuals develop various types of software for execution on computing devices. This development includes writing new code as well as changing previously created code, such as to fix issues discovered in or to add features to previously created software. This development typically involves various steps, such as writing code, testing code, changing code to fix issues discovered during testing, re-testing the changed software code, and so forth.

Oftentimes software includes many different files that include various libraries, data, instructions, and so forth that operate together to provide some functionality. Software can have a very long lifespan (e.g., decades as features are continually added or improved) and there are typically multiple individuals that contribute to developing the software. The set of individuals that contribute to the software continuously changes over its lifespan, seasoned experienced developers leave and new, inexperienced developers join. All code written by these different individuals is typically treated the same and goes through the same steps to take that code from the developer and create the actual executing application ("deployment" of the code). This is regardless of the individual and regardless of the type of code written (e.g., the functionality that the code provides). However, different individuals usually have different skills, experience and proficiencies when it comes to writing code, different types of code can implement functionality with different importance (e.g., some code may provide essential functionality whereas other code may provide functionality for minor features or optimizations), and code modifications can occur in places where the existing code is hard to understand and prone to errors, or in places where the code is easy to reason about making the code easy to change. This can lead to the situation where issues with code that has been written are not identified until late in the development process despite the differences in individuals' skills and proficiencies, and despite the differences in types of code, or areas of code that is modified. This late identification of issues with the code is more costly in terms of money and time to fix than if the issues had been identified earlier in the deployment process. Accordingly, not only do these situations increase the cost, and the time taken, to develop code, but they also increase the risk of a lower quality product being released—not all issues are caught.

SUMMARY

To mitigate the drawbacks of conventional software development processes, an automated code deployment pipeline is described that uses a risk profile to determine whether to obtain additional verification at each of multiple stages in the pipeline. A code change occurs against a code repository, which is the system that maintains all the code that constitutes the software in source form, maintained as a set of code files. A code change originates from a developer wishing to make some change in the software's behavior. The developer makes the change to at least one file and when ready submits the change to the deployment pipeline. A risk profile for the code change is automatically generated based on a repository risk score as well as a code change risk score and a developer risk score. The repository risk score is based on both a collection of historical outcomes of code submissions and additional data describing the code repository. The developer risk score is based on a collection of historical outcomes of code submissions by that developer. The code change risk score is based on analysis of a history of the code change in the code repository. A determination is made whether the risk profile meets a verification criteria. The code change is prevented from progressing to a next stage in the automated code deployment pipeline in response to determining that the risk profile meets the verification criteria.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
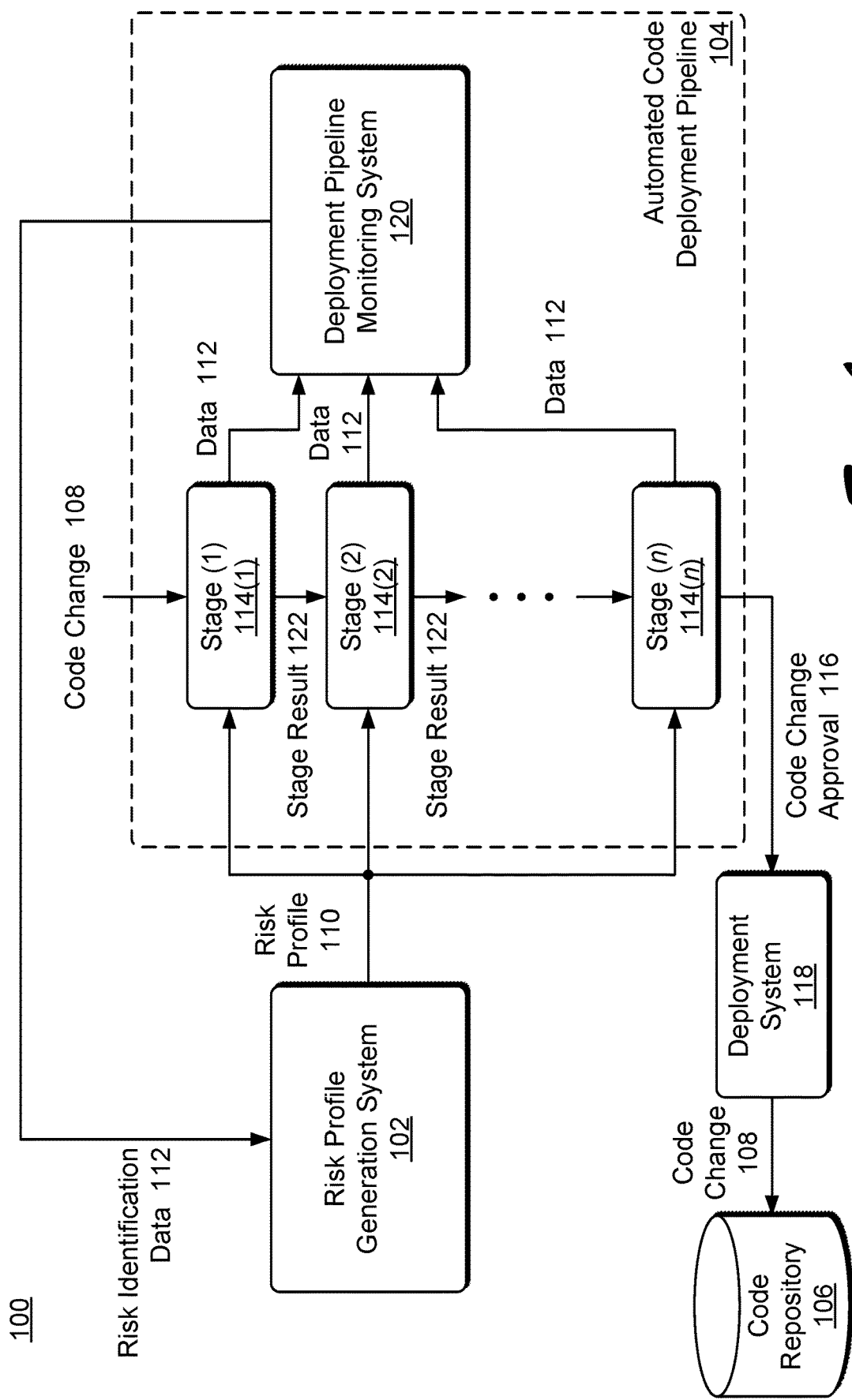
FIG. 1 is an illustration of a code deployment digital medium environment in an example implementation that is operable to employ the automated code testing for code deployment pipeline based on risk determination described herein.

Techniques for automated code testing for code deployment pipeline based on risk determination are described herein. Generally, in one or more implementations, software code is written using an automated code deployment pipeline that includes multiple stages (also referred to herein as a multistage automated code deployment pipeline). A code change (also referred to as a pull request) is provided to the automated code deployment pipeline and at each stage one or more checks or evaluations of the code change is performed. Additionally, a risk profile is generated for the code change that identifies a risk of making the code change based on the code change itself as well as a reputation of the individual providing the code change. In one or more stages, the risk profile is used to determine whether a verification criteria is met. The verification criteria being met indicates that additional verification of the code change is desired (in addition to any testing typically performed at that stage), and if the verification criteria is met the code change does not progress to the next stage in the automated code deployment pipeline until the evaluation of the code change is successful and any additional verification that is desired is performed. Accordingly, the software code is tested in an automated manner based on the risk of the software code change and the reputations of the individuals writing the program code.

A code repository maintains all the code that constitutes a software application or program in source form, maintained as a set of code files. When a developer desires to make a change in the software's behavior, the developer makes changes to a local copy of at least one code file in the code repository, such as by adding lines of code, deleting lines of code, modifying lines of code, and so forth. The changed code files are submitted to an automated code deployment pipeline as a code change (also referred to as a pull request). After the changes to the at least one code file successfully pass through the automated code deployment pipeline the changes are deployed to the code repository, which form the basis of the released application or program.

The automated code deployment pipeline includes a deployment pipeline monitoring system that monitors the code change through the stages of the pipeline. This monitoring can include collecting data regarding different types of data (also referred to as indexes). For example, these types of data that are collected can include data regarding the code repository (e.g., the number of files in the code repository, the sizes of files in the code repository), data regarding the code change (e.g., how many lines of code in the code repository are changed by the code change), whether the code change failed a test at one of the pipeline stages, whether peer review comments were received in a stage, whether the code change was altered in response to peer review comments in a stage, and so forth. This collected data is provided to a risk profile generation system as risk identification data.

The risk profile generation system generates a risk profile for the code change. Any code change that is deployed to the code repository potentially has a risk of negatively impacting operation of the software, such as by introducing one or more bugs or issues to the software. The risk profile is generated using the risk identification data and is based on a repository risk score, a code change risk score, and a developer risk score, as discussed in more detail below.

The code change risk score (also referred to as simply the code change risk) indicates the risk of making the code change in light of the history of the code change in the code repository. The code change risk is based on analysis of risk of the developer making a change to the code repository along with analysis of the code change as it progresses through the pipeline. The higher the number of issues that the code change presents as it progresses through the pipeline, the greater the code change risk. The code change may undergo various modifications and versions during its development, and this history is accounted for in the code change risk. The code change risk can be generated using any of the risk identification data. For example, the code change risk can be generated using data including how many times the code change has failed a stage in the pipeline (e.g., failed because a test at the stage fails, failed because the age of the code is too high, failed because a peer reviewer rejects the code change), peer review interactions with the code change (e.g., comments made by a peer reviewer, questions asked by a peer reviewer, corrections indicated by a peer reviewer), what the reaction of the developer of the code change is to the peer review interactions, the number of lines of code in the code repository that are changed by the code change, the number of quality gate failure exceptions given for the code change (e.g., how many times a manager has overridden a failure at a stage), how many code changes the developer has merged with the code repository, and so forth.

The repository risk score (also referred to as simply the repository risk) indicates the complexity of the code repository and consequently how difficult it is to expect a new developer to be able to quickly make code changes that make the desired software behavior change and do not introduce bugs or issues to the software. The repository risk is based on both a collection of historical outcomes of code submissions (a positive outcome is where a code submission has not led to any issues, a negative outcome is where a code submission has led to issues) and additional data describing the code repository that identifies further risk, such as the overall size of the code repository, the number of developers, and the amount of changes being made to the repository. The repository risk can be generated using any of the risk identification data. For example, the repository risk can be generated using data including the number of files in the code repository, the number of developers that have contributed code to the code repository, an aggregate of all code change risks that relate to all submissions made against the code repository, and so forth.

The developer risk score (also referred to as simply the developer risk) indicates the risk of the developer that contributes code changes to a repository. The developer risk is based on a collection of historical outcomes of code submissions by that developer to the repository, and previous history contributing to other code repositories. No two developers are the same and the ability to contribute effectively to the code repository is based on both the developer's ability and experience. The developer risk is aggregated over time using any of the risk identification data, such as the number of code changes the developer has merged with the code repository, as well as the code change risk for each code change and the developer risk for the peer reviewers of each code change. Each of these (the number of code changes, the code change risk for each code change, and the developer risk for the relevant peer reviewers) is also referred to as a different type or index of data.

Each of the repository risk score, the code change risk score, and the developer risk score can be generated in the same manner but using different risk identification data. To generate a risk score, the data for the indexes used to generate the risk score is obtained from the deployment pipeline monitoring system or the risk profile generation system. Any of a variety of different algorithms or equations can be applied to the obtained data in order to generate each index. In one or more implementations, for each index, the data is standardized using the statistics standardization equation $Z=(x-m)\div s$, where x refers to the value being standardized, m refers to the mean of the distribution, and s refers to the standard deviation of the distribution. An index value for each index is generated by adding the standardized value for that index to the smallest value in the data for that index. These index values are generated at some interval, such as weekly. Accordingly, these index values are also referred to as periodic index values, and a periodic risk score is generated by summing the periodic index values. An overall risk score is generated by averaging the periodic risk values. These periodic risk scores are snapshots of these index values overs set time periods (e.g., weekly), allowing a determination to be made as to whether risk score is improving, declining, or remaining the same over time.

The risk profile is generated from the repository risk score, the code change risk score, and the developer risk score. The risk profile can be these three risk scores (e.g., each generated risk score is provided as part of the risk profile), or a value can be generated using these three risk scores (e.g., by summing the repository risk score, the code change risk score, and the developer risk score).

The automated code deployment pipeline includes multiple stages for code deployment. These stages can include one or more testing stages where the code change is tested, one or more review stages where the code change is reviewed by other systems or reviewers, one or more merging stages where the code change is included in the program, and so forth. In at least one stage various checks or evaluations of the code change are made, and furthermore the risk profile is used to determine whether verification criteria a met indicating that additional verification is required for the code change. For example, if the risk profile is greater than a threshold value then the verification criteria is met and additional verification is required. This additional verification is in addition to any tests regularly performed at the stage, and can include various types of verification such as approval from a particular individual (e.g., the manager of the developer that submitted the code change), additional tests to be run on the code change, a requirement that the code change be reviewed by one or more additional peer reviewers, a requirement that the code change undergo a targeted peer review (the individuals performing the peer review are senior subject experts, identified as having significant code contribution to the files being modified by the code change over the history of the software), and so forth. For each stage where the verification criteria is met and additional verification is desired, the code change does not progress to the next stage until the evaluation of the code change is successful and the additional verification that is required is performed (or a manager override is received to indicate the manager accepts the extra risk without the additional verification).

Once the code change has passed all the stages of the automated code deployment pipeline, the code change becomes an approved code change that can then be deployed to (also referred to as merged with or added to) the code repository. Once deployed to the code repository, the approved code change can be included in future distribution of the software in the code repository, can be provided as an update to existing installations of the software, and so forth.

The techniques discussed herein allow for additional quality checks and verifications based on the risk of the code change itself, as well as based on the reputation of the developer and the complexity of the code repository being changed. This allows high quality software to be developed, reducing the risk of bugs or other issues with changes to the software because changes with a high risk of having bugs or creating issues with the software (whether because of the code change itself, the complexity of the code repository, or the developer of the code change) are automatically identified and subjected to additional scrutiny.

Furthermore, using the techniques discussed herein the efficiency of the code deployment pipeline is increased. Time, money, and computational resources need not be expended on heavily testing code changes with a low risk of bugs or other issues. Rather, such time, money, and computational resources are made available for code changes with a higher risk of bugs or other issues.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a code deployment digital medium environment 100 in an example implementation that is operable to employ the automated code testing for code deployment pipeline based on risk determination described herein. The environment 100 allows for automated software code testing and development. The environment 100 includes a risk profile generation system 102 and an automated code deployment pipeline 104. The automated code deployment pipeline 104 can also be referred to as a continuous integration/continuous deployment (CI/CD) system. Although many of the discussions herein refer to software, it is to be appreciated that the techniques discussed herein apply to other types of code (e.g., firmware).

A code repository 106 maintains all the code that constitutes a software application or program in source form, maintained as a set of code files. When a developer desires to make a change in the behavior of the software, the developer makes changes to a local copy of at least one code file in the code repository 106. The changes made on at least one file are submitted to the automated code deployment pipeline 104 as code change 108. This code change 108 may also be referred to as a pull request. These changes to the at least one code file can include adding lines of code, deleting lines of code, modifying lines of code, and so forth. After the changes successfully pass through the automated code deployment pipeline 104 the changes are deployed to the code repository 106 as a code change approval 116.

The risk profile generation system 102 generates a risk profile 110 for the code change 108. The risk profile 110 is generated from risk identification data 112 and is based on a repository risk score, a code change risk score, and a developer risk score, as discussed in more detail below. Any code change 108 that is deployed to the code repository 106 potentially has a risk of negatively impacting operation of the software, such as by introducing one or more bugs or issues to the software. The risk profile 110 for a code change 108 is a measure of the risk of the code change 108 negatively impacting operation of the software.

The risk profile 110 is provided to the automated code deployment pipeline 104. The automated code deployment pipeline 104 includes multiple (n) stages for code deployment, illustrated as stages 114(1), 114(2), . . . , 114(n). For a code change 108, in at least one stage 114, one or more checks or evaluations of the code change 108 is made, and the risk profile 110 is used to determine whether a verification criteria is met indicating that additional verification is required for the code change 108. For each such stage 114 the code change 108 does not progress to the next stage 114 until the evaluation of the code change is successful (or a manager intervenes with an override indicating they take responsibility for the extra risk) and any additional verification that is required is performed. At each stage 114, a stage result 122 is output indicating either approval of the code change 108 (allowing the code change 108 to progress to the next stage 114) or denial of the code change 108 (preventing the code change 108 from progressing to the next stage 114). The code change 108 is not passed or released to a next stage 114 (or the next stage 114 will not work on the code change 108) unless the stage result 122 from the previous stage 114 indicates approval of the code change 108.

Once the code change 108 has passed all the stages 114 of the automated code deployment pipeline 104, the code change approval 116 for the code change 108 is provided to a deployment system 118, indicating that the code change 108 is approved for deployment. The deployment system 118 receives the code change approval 116 and deploys the code change 108 to the code repository 106 (e.g., merges the code change 108 with the code repository 106 by adding the changed code to the code repository 106, resulting in a new version of the code). Once deployed to the code repository 106, the code change 108 can be included in future distribution of the software in the code repository 106, can be provided as an update to existing installations of the software, and so forth.

The automated code deployment pipeline 104 can include any number of different stages 114 as desired by the developer or company using the automated code deployment pipeline 104. These stages can include one or more testing stages where the code change is tested (e.g., using one or more test programs), one or more review stages where the code change is reviewed by other systems or reviewers, one or more merging stages where the code change is included in the program, and so forth.

By way of example, the automated code deployment pipeline can include a peer engineer review stage, followed by a unit test stage, followed by a merge/build stage, followed by a system/integration test stage. In the peer engineer review stage the code change 108 is communicated to one or more peer engineers (peer developers) and feedback is received from the one or more peer engineers (e.g., an indication that the code change 108 is approved by a peer engineer, an indication of a problem with the code change 108 identified by the peer engineer).

In the unit test stage one or more tests are run on the code change 108, such as to verify that the changed at least one code file is running as intended. These one or more tests can include standard tests that can test multiple different code changes, tests specifically designed to test the code change 108, and so forth. These tests include automatic tests that are, for example, programs themselves that test the code change 108.

In the merge/build stage the code change 108 is added to the code repository and one or more tests are run on the code change 108 in the software to verify that the code change 108 is running as intended. In this stage the code change can be added to an internal version or copy of the code change 108 and is typically not available to customers. These one or more tests can include standard tests that can test multiple different code changes, tests specifically designed to test the code change 108 in the software, and so forth. These tests include automatic tests that are, for example, programs themselves that test the code change 108 in the software.

In the system/integration test stage one or more tests are run on the entire software to verify that the entire software with the code change 108 is running as intended. These one or more tests can include standard tests that can test various different functionality or operation of the software, tests specifically designed to test the software with the code change 108, and so forth. These tests can include automatic tests that are, for example, programs themselves that test the software.

Although the example above describes an example automated code deployment pipeline that includes a peer engineer review stage, followed by a unit test stage, followed by a merge/build stage, followed by a system/integration test stage, it should be noted that this is only an example. The automated code deployment pipeline 104 can include any number of different stages arranged in any order. The automated code deployment pipeline 104 need not include all of the stages discussed in the example above, can include the stages discussed in the example above but in a different order than discussed above, can include additional stages, and so forth.

The automated code deployment pipeline 104 also includes a deployment pipeline monitoring system 120 that monitors the code change 108 through the stages 114. This monitoring can include collecting different types of risk identification data 112, such as data regarding the code repository 106 (e.g., the number of files in the code repository 106, the sizes of files in the code repository 106), data regarding the code change 108 (e.g., how many lines of code in the code repository 106 are changed by the code change 108), data indicating whether the code change 108 failed a test at a stage 114, data indicating whether peer review comments were received in a stage 114, data indicating whether the code change 108 was altered in response to peer review comments in a stage 114, and so forth. This collected data is provided to the risk profile generation system 102 as the risk identification data 112. The various data that can be collected by the deployment pipeline monitoring system 120 and included in the risk identification data 112 is discussed in more detail below.

Various actions performed by various modules and systems are discussed herein. It should be noted that a particular module or system discussed herein as performing an action includes that particular module or system performing the action in conjunction with another component, module, or system.

Automated Code Testing Architecture

Figure 2:
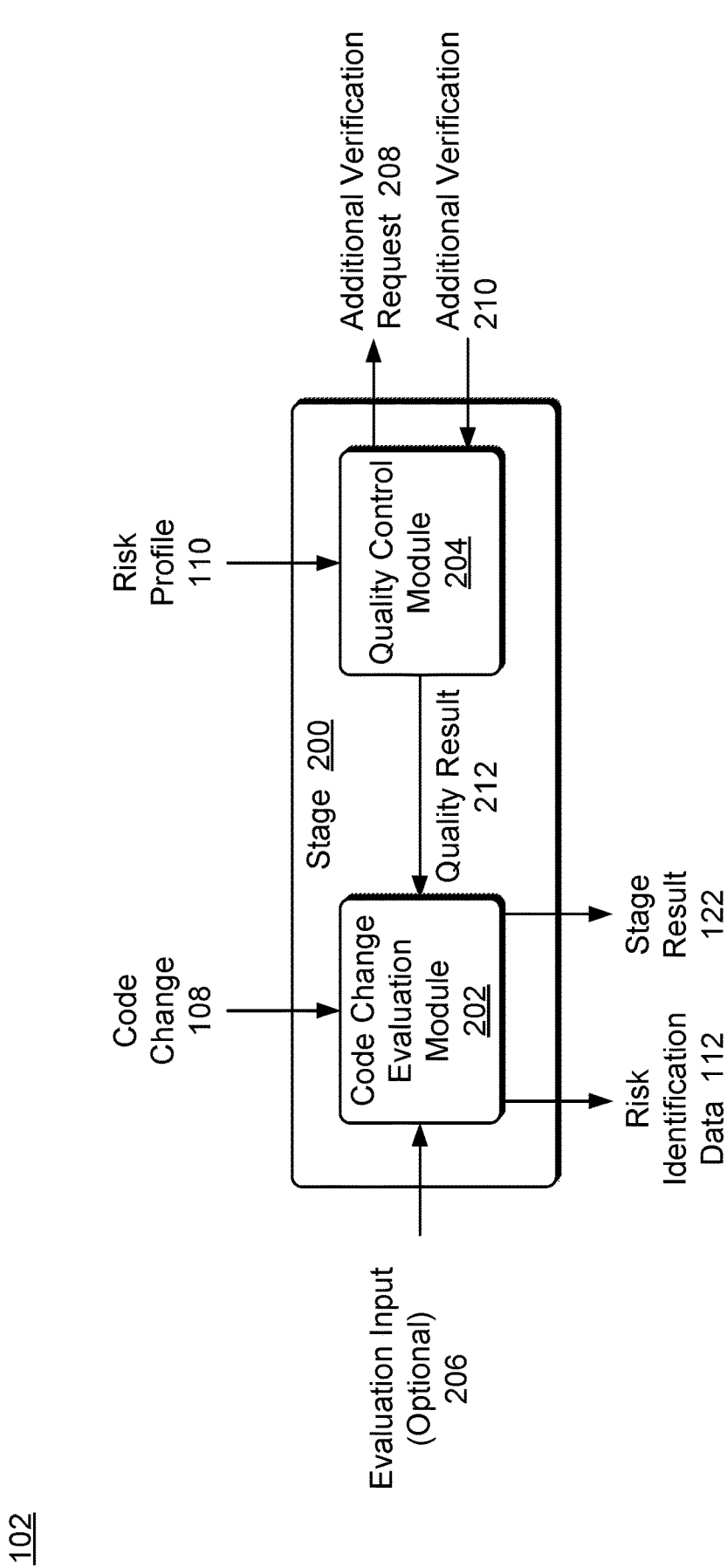
FIG. 2 illustrates an example stage in the automated code deployment pipeline.

FIG. 2 illustrates an example stage 200 in the automated code deployment pipeline. In one or more implementations, the stage 200 is an example of each stage 114(1), . . . , 114(*n*) in the automated code deployment pipeline 104. The stage 200 includes a code change evaluation module 202 and a quality control module 204. The code change evaluation module 202 receives the code change 108 and can perform various analysis on the code change 108, such as running one or more tests on the code change 108, obtaining peer review of the code change 108, and so forth. This evaluation can optionally be based on received evaluation input 206, such as input received from one or more peer reviewers of the code change 108. This evaluation results in an indication of acceptance or rejection of the code change 108. For example, if a test run on the code change 108 fails, or a peer review identifies issues with the code change 108, then the evaluation results in an indication of rejection of the code change 108. However, if tests run on the code change 108 pass, or a peer review does not identify issues with the code change 108, then the evaluation results in an indication of acceptance of the code change 108.

The quality control module 204 receives the risk profile 110 and determines, based on the risk profile 110, whether verification criteria are met indicating that additional verification of the code change 108 is desired. In one or more implementations, this additional verification is approval from a particular person, such as a particular individual (e.g., the manager of the developer that submitted the code change 108, the owner or manager of the code repository 106), an individual with a particular position or title (e.g., a title of "supervisor" or "program manager"), and so forth. Additionally or alternatively, this additional verification can take different forms, such as additional tests to be run on the code change 108, a requirement that the developer perform one or more additional tests on the code change 108, a requirement that the code change 108 be reviewed by one or more additional peer reviewers (e.g., other developers working on the code repository 106), a requirement that the code change 108 undergo a targeted peer review (the individuals performing the peer review are senior subject experts, identified as having significant code contribution to the files being modified by the code change 108 over the history of the software), and so forth. Having this additional verification allows the stage 200 to enforce additional checks being made if the risk profile 110 indicates that the code change 108 is a high risk change.

In one or more implementations, the quality control module 204 determines whether verification criteria indicate that additional verification of the code change 108 is desired by comparing the risk profile 110 to a risk threshold. If the risk profile 110 satisfies (e.g., is equal to or exceeds) the risk threshold then the verification criteria is met and additional verification is required. However, if the risk profile 110 does not satisfy (e.g., is not equal to or does not exceed) the risk threshold then the verification criteria is not met and additional verification is not required. The risk threshold can be set in various manners, such as a default value set by the developer of the automated code deployment pipeline 104, by the owner or manager of the code repository 106, and so forth. The risk threshold is set at a level so that code changes that are a high risk of causing bugs or issues when merged with or deployed to the code repository 106 are identified by the quality control module 204.

Additionally or alternatively, whether the verification criteria is met indicating that additional verification of the code change 108 is required can be determined in different manners. For example, various rules or criteria can be applied to the risk profile 110 to determine whether the verification criteria is met indicating that additional verification of the code change 108 is required. By way of another example, a machine learning system can be trained on a set of training data including risk profiles for code changes and whether those code changes resulted in bugs or issues when merged with the code repository 106. The machine learning system can then evaluate the risk profile 110 and determine whether the risk profile 110 indicates that the verification criteria is met indicating that additional verification of the code change 108 is required.

As discussed in more detail below, the risk profile 110 includes a repository risk score, a code change risk score, and a developer risk score. Although the techniques discussed herein are discussed with reference to evaluating the risk profile 110, it should be noted that additionally or alternatively the quality control module 204 can determine whether the verification criteria is met indicating that additional verification of the code change 108 is required based on one or more of the repository risk score, the code change risk score, and the developer risk score individually. For example, different risk thresholds can be associated with and applied to each of the repository risk score, the code change risk score, and the developer risk score, and if any one (or alternatively any two) of those risks satisfy the associated risk threshold then the quality control module 204 determines that the verification criteria is met and additional verification of the code change 108 is required.

If the quality control module 204 determines that the verification criteria is met and additional verification of the code change 108 is required then the quality control module 204 sends an additional verification request 208. The additional verification request 208 can be sent in a variety of different manners, such as an email or notification requesting that the code change 180 be reviewed and approved, a command to invoke one or more additional test programs, and so forth. The particular additional verification that is requested can be determined in a variety of different manners. For example, the additional verification that is requested can vary for different stages 114 and can be maintained by the quality control module 204 (e.g., pre-programmed into the quality control module 204, set as a user preference, obtained from another device or system, and so forth). By way of another example, the additional verification that is requested can vary based on the risk profile 110 (e.g., the quality control module 204 may include multiple thresholds and if the risk profile 110 satisfies a lower threshold but not a higher threshold then a first set of additional verification is requested, but if the risk profile 110 satisfies both the lower and higher threshold then a second set of additional verification is requested (typically including more additional verification than the first set).

If the additional verification is performed and verifies that the code change 108 can be approved, then an additional verification 210 is received. However, if the additional verification is not performed or does not verify that the code change 108 can be approved, then the additional verification 210 is not received (e.g., a verification fail or denial can be received).

The quality control module 204 communicates a quality result 212 to the code change evaluation module 202. The quality result 212 indicates either acceptance or rejection of the code change 108 by the quality control module 204. If the quality control module 204 determines that additional verification of the code change 108 is not required, then the quality control module 204 provides a quality result 208 indicating acceptance of the code change 108. If the quality control module 204 determines that additional verification of the code change 108 is required and the quality control module 204 receives the additional verification 210, then the quality control module 204 provides a quality result 208 indicating acceptance of the code change 108. However, if the quality control module 204 determines that additional verification of the code change 108 is required but the quality control module 204 does not receive the additional verification 210, then the quality control module 204 provides a quality result 208 indicating rejection of the code change 108.

As discussed above, the code change evaluation module 202 evaluates the code change 108, which results in an indication of acceptance or rejection of the code change 108. The code change evaluation module 202 generates a stage result 122, based on the evaluation the code change evaluation module 202 performs and the quality result 212, indicating either approval or denial of the code change 108. If both the evaluation performed by the code change evaluation module 202 and the quality result 212 indicate acceptance, then the stage result 122 indicates approval of the code change 108. This approval allows the code change 108 to advance to (also referred to as being released to) the next stage in the automated code deployment pipeline 104.

However, if one or both of the evaluation performed by the code change evaluation module 202 and the quality result 212 indicates rejection, then the stage result 122 indicates denial of the code change 108. This denial is communicated to the developer, such as via an email, a notification or alert in the automated code deployment pipeline 104, etc. The automated code deployment pipeline 104 does not allow the code change 108 to advance to the next stage in the automated code deployment pipeline 104 based on the denial. In order for the developer to advance the code change 108 to the next stage in the automated code deployment pipeline 104 the developer must make one or more modifications (e.g., additional changes to the code, submit additional tests to be performed, etc.) and re-submit the code change 108 as modified or alternatively a manager can accept the increase in risk and override the denial. Note, in this latter case, the number of exceptions provided by a manager increases the overall code change risk.

The code change evaluation module 202 also outputs risk identification data 112. This risk identification data 112 output by the code change evaluation module 202 is data indicating how the code change 108 fared in the stage 200. For example, this risk identification data 112 can be data indicating whether the code change 108 failed a test at the stage 200, data indicating whether peer review comments were received in the stage 200, data indicating whether the code change 108 was altered in response to peer review comments in the stage 200, and so forth. This risk identification data 112 is output to the risk profile generation system 102 (e.g., via the deployment pipeline monitoring system 120) as discussed above to generate the risk profile 110. Thus, at each stage risk identification data 112 can be collected, fed back to the risk profile generation system 102, and used for subsequent generation of the risk profile 110.

Figure 3:
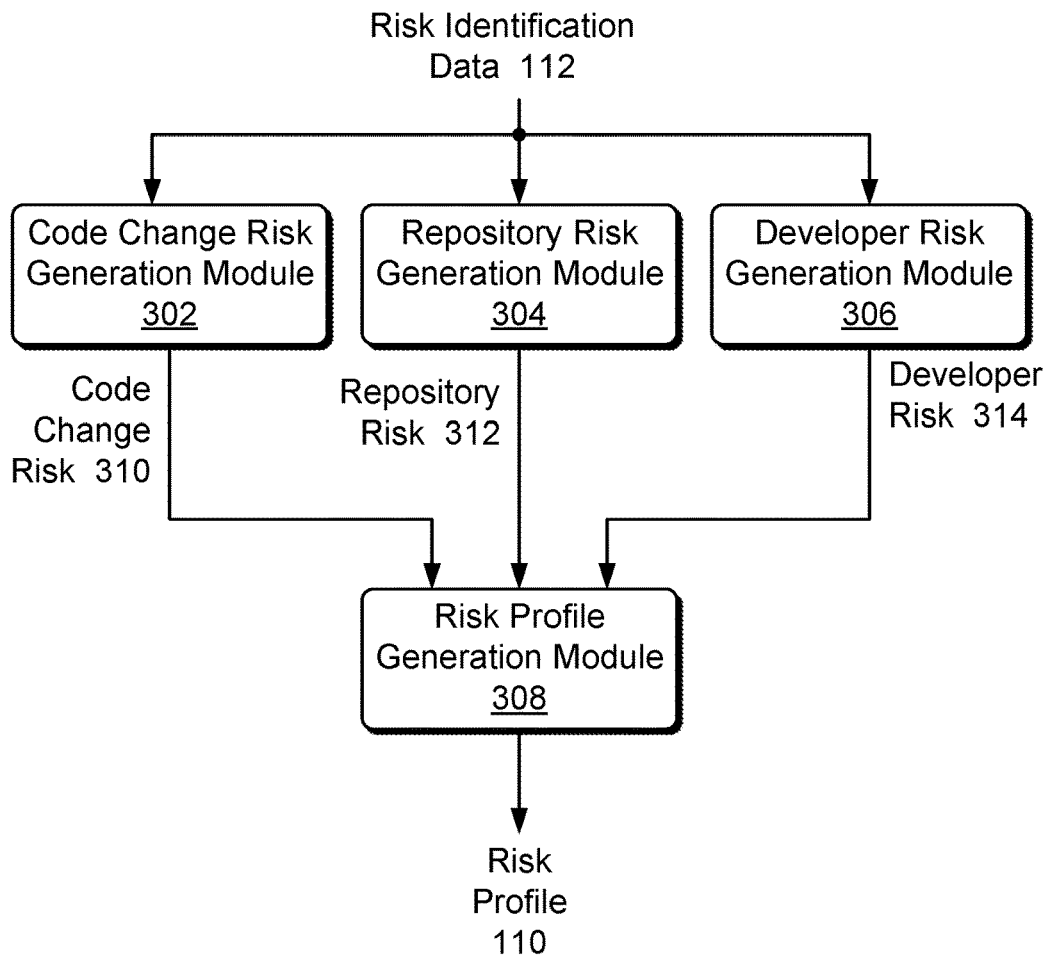
FIG. 3 illustrates an example risk profile generation system.

FIG. 3 illustrates an example risk profile generation system. The risk profile generation system includes 102 includes a code change risk generation module 302, a repository risk generation module 304, a repository risk generation module 306, and a risk profile generation module 308. The code change risk generation module 302 generates the code change risk 310 based on the risk identification data 112 and provides the code change risk 310 to the risk profile generation module 308. The repository risk generation module 304 generates the repository risk 312 based on the risk identification data 112 and provides the repository risk 312 to the risk profile generation module 308. The developer risk generation module 306 generates the developer risk 314 based on the risk identification data 112 and provides the developer risk 314 to the risk profile generation module 308. The risk profile generation module 308 generates the risk profile 110 based on the repository risk 312, the code change risk 310, and the developer risk 314.

The risk profile generation system 102 receives various risk identification data 112 from the deployment pipeline monitoring system 120, with different risk identification data being used by different ones of the code change risk generation module 302, repository risk generation module 304, and repository risk generation module 306. The same risk identification data can be provided to each of the modules 302, 304, and 306 to use as they desire. Additionally or alternatively, the specific risk identification data that each of the modules 302, 304, and 306 uses can be provided to that particular module.

In one or more implementations, the risk identification data 112 includes an indication of the age of the code change. The age of the code change refers to the amount of time (e.g., a number of days) between the time when the code change was created (e.g., the developer first started working on the code change or the code change was first input to the automated code deployment pipeline 104) and the current time.

In one or more implementations, the risk identification data 112 includes an indication of the number of developers that have contributed code to the code repository 106. This number is an indication of how many unique developers have provided code changes to the code repository 106.

In one or more implementations, the risk identification data 112 includes an indication of how many times the code change failed in any stage of the automated code deployment pipeline 104. A large number of code change failures can be an indication that the developer is "thrashing" and attempting to bend something of questionable quality into passing the various quality gates. How many times the code change failed can be evaluated relative to the average number of failures per code change in the software, e.g., the number of code change failures for the code change divided by the average number of failure per code change across the history of the software (or some other period of time, such as one year). Each occurrence of a failure of the code change 108, up until the code change 108 is merged with or deployed to the code repository 106, is counted to provide the indication of how many times the code change failed.

The failure of a code change can be determined using various different criteria, such as quality gate failures, age of the code change, code review rejections, combinations thereof, and so forth. The quality gate failures refer to situations where a potential issue with the quality of the code change is identified that causes the code change evaluation module 202 to provide a stage result 122 of denial. Quality gate failures can be caused by failure of a test by the code change evaluation module, such as a unit test that is specifically designed to test the code change, an integration test that is specifically designed to test the code change when merged with the software (e.g., in a temporary or test copy of the code repository 106). Quality gate failures can also be caused by failure of static analysis, such as failure or rejection of the code change based on peer review of the code change 108. Quality gate failures can also be caused by failure of code coverage, such as tests written to test less than a sufficient amount of the code change (e.g., less than a threshold amount, such as 75% of the code change).

The age of the code change failures refer to situations where the age of the code change causes the code change evaluation module 202 to provide a stage result 122 of denial. If the age of the code is too high, there is a possibility that the code repository 106 has changed sufficiently enough that the code change 108 will cause issues or bugs if merged with the code repository 106. In one or more implementations, the quality control module 204 determines that an age of the code change failure occurs in response to the age of the code change satisfying (e.g., equaling or exceeding) an age threshold (which is set at an age where the code repository 106 has likely changed enough to result in a high risk of the code change causing bugs or issues when merged with the code repository 106). Additionally or alternatively, the quality control module 204 can determine that an age of the code change failure occurs in different manners, such as applying various rules or criteria to the age of the code change, using a machine learning system trained on a set of training data including ages of code changes and whether those code changes resulted in bugs or issues when merged or deployed to the code repository 106, and so forth.

The code review rejection failures refer to situations where evaluation input 206 received from a reviewer (e.g., a peer reviewer of the code change 108) rejects the code change 108. A reviewer can reject the code change 108 for any of a variety of reasons, such as the reviewer identifying an error in the code change 108, the reviewer identifying a different, likely better way of implementing functionality in the code change 108, In one or more implementations, the risk identification data 112 includes an indication of how many times files in the code repository 106 have been changed over a particular time period, such as over the previous month, the previous two weeks, or the history of the software (e.g., since the code repository 106 for the software was created). A large number of changes can indicate a higher risk of conflicting changes and lack of stability in the software than is indicated by a smaller number of changes. How many times files in the code repository 106 have been changed can be evaluated relative to the average number of failures that occurred for code changes in the software over the particular period of time (e.g., the number of changes divided by the average number of failures across the history of the software (or some other period of time, such as one year)). This allows a particular number of changes to indicate a lower risk of conflicting changes and lack of stability if the average number of failures is low, and a higher risk of conflicting changes and lack of stability if the average number of failures is higher.

In one or more implementations, the risk identification data 112 includes an indication of the sizes of files in the code repository 106 (also referred to as the file sizes). Changes to large monolithic files can carry more risk than updating small, encapsulated files. The file sizes can be calculated in different manners, such as the sum of the file sizes in the code repository 106, the average of the file sizes in the code repository 106, and so forth. The file sizes can be evaluated relative to the average number of failures that have occurred relative to the file sizes for code changes in the software across the history of the software (or some other period of time, such as one year), such as by dividing the file sizes by the average number of failures that have occurred relative to the file sizes for code changes in the software. This allows the file sizes to indicate a lower risk if the average number of failures that have occurred relative to the file sizes for code changes in the software is low, and a higher risk if the average number of failures that have occurred relative to the file sizes for code changes in the software is higher.

In one or more implementations, the risk identification data 112 includes an indication of the number of lines of code in the code repository 106 that are changed by a particular code change. S coped changes can inherently carry less risk than large sweeping changes that span the code repository. The number of lines of code in the code repository 106 that are changed can be evaluated relative to the average number of failures that have occurred relative to the number of lines of code that have been changed in the software across the history of the software (or some other period of time, such as one year), such as by dividing the number of lines of code that have been changed by the average number of failures that have occurred relative to the number of lines of code that have been changed. This allows the number of lines of code that are changed by a particular code change to indicate a lower risk if the average number of failures that have occurred relative to the number of lines of code that have been changed in the software is low, and a higher risk if the average number of failures that have occurred relative to the number of lines of code that have been changed in the software is higher.

In one or more implementations, the risk identification data 112 includes an indication of the number of files in the code repository 106 that are changed by a particular code change. Scoped changes can inherently carry less risk than large sweeping changes that span the code repository. The number of files in the code repository 106 that are changed can be evaluated relative to the average number of failures that have occurred relative to the number of files that have been changed in the software across the history of the software (or some other period of time, such as one year), such as by dividing the number of files that have been changed by the average number of failures that have occurred relative to the number of files that have been changed. This allows the number of files that are changed by a particular code change to indicate a lower risk if the average number of failures that have occurred relative to the number of files that have been changed in the software is low, and a higher risk if the average number of failures that have occurred relative to the number of files that have been changed in the software is higher.

In one or more implementations, the risk identification data 112 includes an indication of the number of quality gate failure exceptions given for the code change 108. The automated code deployment pipeline 104 allows a manager or other individual (e.g., senior developer or other trusted developer) to override a failure at any stage, which is also referred to as an exception. A large number of exceptions can indicate a higher risk of conflicting changes and lack of stability in the software than is indicated by a smaller number of exceptions. The number of exceptions given for the code change 108 can be evaluated relative to the average number of exceptions given for code changes in the software over a particular period of time, e.g., the number of exceptions given divided by the average number of exceptions given across the history of the software (or some other period of time, such as one year). This allows a particular number of exceptions given to indicate a lower risk of conflicting changes and lack of stability if the average number of exceptions given is low, and a higher risk of conflicting changes and lack of stability if the average number of exceptions given is higher.

In one or more implementations, the risk identification data 112 includes an indication of aggregated peer review interactions with the code change 108 over a particular time period, such as over the previous month, the previous two weeks, or the history of the software (e.g., since the code repository 106 for the software was created). The peer review interactions refer to interactions (e.g., comments made, questions asked, corrections indicated) by a peer reviewer with the code change 108. The peer review interactions are input via the automated code deployment pipeline 104 and are accessible to the developer (e.g., can be emailed to the developer, the developer can access the automated code deployment pipeline 104 to view the peer review interactions, and so forth). The peer review interactions can be used in conjunction with the repository risk 312 as discussed in more detail below. In one or more implementations, the indication of peer review interactions includes how many peer review interactions occurred over the particular time period. How many peer review interactions have occurred can be evaluated relative to the average number of peer review interactions that occurred for code changes in the software over the particular period of time, e.g., the number of peer review interactions divided by the average number of peer review interactions across the history of the software (or some other period of time, such as one year).

Additionally or alternatively, the indication of peer review interactions can include a sentiment of the peer review interactions. Any of a variety of different public or proprietary sentiment analysis algorithms can be used to determine the sentiment of the peer review interactions. The deployment pipeline monitoring system 120 can determine the sentiment of the peer review interactions and include an indication of the sentiment in the risk identification data 112. Additionally or alternatively, the deployment pipeline monitoring system 120 can include the peer review interactions in the risk identification data 112 and the quality control module 204 can determine the sentiment of the peer review interactions. The sentiment analysis is used to determine whether the sentiment of the peer review interactions is positive or negative. A negative sentiment can indicate a higher risk of conflicting changes and lack of stability in the software than is indicated by a positive sentiment.

In one or more implementations, the risk identification data 112 includes an indication of what the reaction of the developer is to the peer review interactions over a particular time period, such as over the previous month, the previous two weeks, or the history of the software (e.g., since the code repository 106 for the software was created). Less reaction from the developer can indicate a higher risk of conflicting changes and lack of stability in the software than is indicated by more reaction. The deployment pipeline monitoring system 120 can monitor the reaction of the developer to the peer review interactions in a variety of different manners. For example, the developer can respond to a peer review interaction via the automated code deployment pipeline 104 (e.g., the developer can entry a reply comment to a peer reviewer's comment), and an indication that a response was made is recorded by the deployment pipeline monitoring system 120. By way of another example, in response to a peer review interaction the developer can modify the code change 108 via the automated code deployment pipeline 104, and an indication that the modification was made is recorded by the deployment pipeline monitoring system 120.

In one or more implementations, the risk identification data 112 includes an indication of how many code changes the developer has merged with the code repository 106 (also referred to as merged code changes) over a particular time period, such as over the previous month, the previous two weeks, or the history of the software (e.g., since the code repository 106 for the software was created). A small number of merged code changes can indicate a higher risk of conflicting changes and lack of stability in the software than is indicated by a larger number of merged code changes. How many code changes the developer has merged with the code repository 106 can be evaluated relative to the average number of merged code changes for all developers in the code repository 106 over the particular period of time, e.g., the number of merged code changes divided by the average number of merged code changes by all developers across the history of the software (or some other period of time, such as one year). This allows a particular number of merged code changes to indicate a lower risk of conflicting changes and lack of stability if the average number of merged code changes is low, and a higher risk of conflicting changes and lack of stability if the average number of merged code changes is higher.

The code change risk generation model 302 generates the code change risk 310 from the risk identification data 112. The code change risk 310 indicates the risk of making the code change 108 in light of the history of the code change 108. The code change risk 310 can be based on any of the risk identification data 112 discussed herein. For example, the code change risk 310 can be based on how many times the code change 108 has failed, peer review interactions with the code change 108, and what the reaction of the developer is to the peer review interactions.

In one or more implementations, the code change risk generation module 302 generates the code change risk 310 based on the number of lines of code in the code repository 106 that are changed by the code change 108, how many times the code change 108 failed, the age of the code change 108, the number of quality gate failure exceptions given for the code change 108, and how many code changes the developer has merged with the code repository 106.

As an example of generating the code change risk 310, the code change risk generation module 302 generates a total code change risk value CR at some interval, such as weekly. Accordingly, the total code change risk value CR is also referred to as a periodic code change risk value. The periodic code change risk value is generated as:

$$CR = L_c + F_c + A_c + E_c + N_c$$

where $L_c$ is an index value that is the number of lines of code in the code repository 106 that are changed by the code change 108, $F_c$ is an index value that is a ratio of the number of times the code change 108 failed to the number of times the code change 108 successfully passed a stage in the automated code deployment pipeline 104, $A_c$ is an index value that is the age of the code change 108, $E_c$ is an index value that is the number of quality gate failure exceptions given for the code change 108, and $N_c$ is an index value that is the number of code changes the developer has merged with the code repository 106.

A data value for each of these index values is generated using the statistics standardization equation $Z=(x-m)\div s$, where x refers to the value being standardized, m refers to the mean of the distribution, and s refers to the standard deviation of the distribution. In one or more implementations each index value is standardized using data for all code changes to the code repository 106 over a particular time period, such as over the previous month, the previous two weeks, or the history of the software (e.g., since the code repository 106 for the software was created). Additionally or alternatively, each index value is standardized using data for a single code change (the code change 108) over a particular time period, such as over the previous month, the previous two weeks, or the history of the software (e.g., since the code repository 106 for the software was created).

For example, a data value L is generated for the index value $L_c$ using $L=(x-m)\div s$, and in this example x refers to number of lines of code in the code repository 106 that are changed by the code change 108, m refers to the mean of the distribution of the number of lines of code in the code repository 106 that are changed by the code change 108, and s refers to the standard deviation of the distribution of the number of lines of code in the code repository 106 that are changed by the code change 108.

Each index value is generated as $Z_c = Z^c + Z_{min}^c$, where $Z_c$ refers to the index value, $Z^c$ refers to the data value generated for $Z_c$, and $Z_{min}^c$ refers to the smallest value in the data used to calculate Z. For example, $L_c$ is generated as $L_c = L^c + L_{min}^c$, where $L_c$ is an index value that is the number of lines of code in the code repository 106 that are changed by the code change 108, $L^c$ refers to the data value generated for $L_c$ as discussed above, and $L_{min}^c$ refers to the smallest value in the data used to calculate $L^c$ (the smallest number of lines of code changed over the particular time period for all code changes to the code repository 106 or a single code change as discussed above).

Accordingly, the index values are generated as:

$$L_c = L^c + L_{min}^c$$

$$F_c = F^c + F_{min}^c$$

$$A_c = A^c + A_{min}{}^c$$

$$E_c = E^c + E_{min}{}^c$$

$$N_c = N^c + N_{min}{}^c$$

These index values are generated at some interval, such as weekly. Accordingly, these index values are also referred to as periodic index values, and are used to generate the periodic code change risk value as discussed above. An overall code change risk value, which is the code change risk 310, is generated by averaging the periodic code change risk values.

The repository risk generation module 304 generates the repository risk 312 from the risk identification data 304. The repository risk 312 indicates the complexity of the code repository 106 and how difficult it is to expect a new developer to be able to quickly make code changes that make the desired change and do not introduce bugs or issues to the software. This complexity can include the number of lines of code in the code repository 106, the number of files in the code repository 106, and so forth. The repository risk 312 also provides a baseline risk value against which code change risks can be measured.

In one or more implementations, the repository risk generation module 304 generates the repository risk 312 in an analogous manner as the change risk generation module 302 generates the code change risk 310, but includes additional data from the risk identification data 112. The repository risk generation module 304 generates the repository risk 312 based on the number of lines of code in the code repository 106 that are changed by the code change 108, how many times code changes failed against the repository, the age of code changes against the repository, the number of quality gate failure exceptions given for the code changes against the repository, and how many code changes developers have merged with the code repository 106, as well as the number of files in the code repository 106 that are changed and the number of developers that have contributed code to the code repository 106.

As an example of generating the repository risk 312, the repository risk generation module 304 generates a total repository risk value RR at some interval, such as weekly. This can be, but need not be, the same interval at which the code change risk value CR is generated. The total repository risk value RR is also referred to as a periodic repository risk value. The periodic repository risk value is generated as:

$$RR = L_r + F_r + A_r + E_r + N_r + C_r + P_r$$

where $L_r$ is an index value that is the number of lines of code in the code repository 106 that are changed by the code change 108, $F_r$ is an index value that is a ratio of the number of times the code change 108 failed to the number of times the code change 108 successfully passed a stage in the automated code deployment pipeline 104, $A_r$ is an index value that is the age of the code change 108, $E_r$ is an index value that is the number of quality gate failure exceptions given for the code change 108, $N_r$ is an index value that is the number of code changes the developer has merged with the code repository 106, $C_r$ is an index value that is the number of files in the code repository 106 that are changed by the code change 108, and $P_r$ is an index value that is the number of developers that have contributed code to the code repository 106.

A data value for each of these index values is generated using the statistics standardization equation $Z = (x - m) \div s$, as discussed above. In one or more implementations each index value is standardized using data for all code changes to the code repository 106 over a particular time period, such as over the previous month, the previous two weeks, or the history of the software (e.g., since the code repository 106 for the software was created). Additionally or alternatively, each index value is standardized using data for a single code change (the code change 108) over a particular time period, such as over the previous month, the previous two weeks, or the history of the software (e.g., since the code repository 106 for the software was created). For example, each index value for the total repository risk value RR can be standardized using data for all code changes to the code repository 106 over a particular time period, whereas each index value for the total code change risk value CR can be standardized using data for a single code change (the code change 108) over a particular time period.

Each index value is generated as $Z_r = Z^r + Z_{min}{}^r$, analogous to the discussion above in calculating $Z_c$. Accordingly, the index values are generated as:

$$L_r = L^r + L_{min}{}^r$$

$$F_r = F^r + F_{min}{}^r$$

$$A_r = A^r + A_{min}{}^r$$

$$E_r = E^r + E_{min}{}^r$$

$$N_r = N^r + N_{min}{}^r$$

$$C_r = C^r + C_{min}{}^r$$

$$P_r = P^r + P_{min}{}^r$$

These index values are generated at some interval, such as weekly. Accordingly, these index values are also referred to as periodic index values, and are used to generate the periodic repository risk value as discussed above. An overall repository risk value, which is the repository risk 312, is generated by averaging the periodic repository risk values.

The developer risk generation model 306 generates the developer risk 314 from the risk identification data 112. The developer risk 314 indicates the risk of the developer that provided the code change 108 creating a code change that results in conflicting changes or lack of stability in the software. No two developers are the same and the ability to contribute effectively to the code repository 106 is based on both the developer's ability and experience. The developer risk 314 generates the developer risk 314 to account for these differences between developers.

In one or more implementations, the developer risk generation module 306 generates the developer risk 314 for the developer that provides code changes against the repository 106 based at least in part on how many code changes the developer has merged with the code repository 106.

In one or more implementations, the developer risk generation module 306 generates the developer risk 314 for the developer that provided code changes against the repository 106 based at least in part on the average code change risk for that developer for changes to the code repository 106 over a particular time period, such as over the previous month, the previous two weeks, or the history of the software (e.g., since the code repository 106 for the software was created). A larger average code change risk can indicate a higher risk of conflicting changes and lack of stability in the software than is indicated by a lower average code change risk. The average code change risk for that developer can be evaluated relative to the average code change risk for other developers contributing code to the code change risk 106 over the particular period of time, e.g., the average code change risk of the developer divided by the average code change risk for other developers across the history of the software (or some other period of time, such as one year). This allows a particular average code change risk to indicate a lower risk of conflicting changes and lack of stability if the average code change risk for other developers is high, and a higher risk of conflicting changes and lack of stability if the average code change risk for other developers is low.

In one or more implementations, the developer risk generation module 306 generates the developer risk 314 for the developer that provides code changes against the repository based at least in part on the average developer risk for peer reviewers of all the code changes 108 over a particular time period, such as over the previous month, the previous two weeks, or the history of the software (e.g., since the code repository 106 for the software was created). These peer reviewers are the peer reviewers that provided peer review interactions for all code changes 108. A larger average developer risk for peer reviewers can indicate a higher risk of conflicting changes and lack of stability in the software than is indicated by a lower average developer risk for peer reviewers. The average developer risk for peer reviewers can be evaluated relative to the developer risk for all developers contributing code to the code change risk 106 over the particular period of time, e.g., the average code change risk of the developer divided by the average code change risk for other developers across the history of the software (or some other period of time, such as one year). This allows average developer risk for peer reviewers to indicate a lower risk of conflicting changes and lack of stability if the average developer risk for all developers is high, and a higher risk of conflicting changes and lack of stability if the average developer risk for peer reviewers is low.

In one or more implementations, the developer risk generation module 306 generates the developer risk 314 in a similar manner as the change risk generation module 302 generates the code change risk 310, but relies on different data. For example, the developer risk generation module 306 generates the developer risk 314 based on the number of code changes the developer has merged with the code repository 106, the average code change risk 310 for all code changes against the repository 106, and the developer risk for the peer reviewers of all the code changes against the repository 106.

As an example of generating the repository risk 312, the developer risk generation module 306 generates a total developer risk value DR at some interval, such as weekly. This can be, but need not be, the same interval at which one or both of the code change risk value CR and the repository risk value RR are generated. The total developer risk value DR is also referred to as a periodic developer risk value. The periodic developer risk value is generated as:

$$DR = S_d + H_d + D_d$$

where $S_d$ is an index value that is the number of code changes the developer has merged with any code repository (including the code repository 106), $H_d$ is an index value that is the average code change risk 310 for code changes the developer has submitted to any code repository (including the code repository 106) over a previous time period (e.g., 1 month), and $D_d$ is an index value that is the developer risk for the peer reviewers of the code change 108.

A data value for each of the $S_d$ and $D_d$ index values is generated using the statistics standardization equation $Z=(x-m)\div s$, as discussed above. In one or more implementations each index value is standardized using data for all code changes to the code repository 106 over a particular time period, such as over the previous month, the previous two weeks, or the history of the software (e.g., since the code repository 106 for the software was created). Additionally or alternatively, each index value is standardized using data for a single code change (the code change 108) over a particular time period, such as over the previous month, the previous two weeks, or the history of the software (e.g., since the code repository 106 for the software was created).

Each of the $S_d$ and $D_d$ index values is generated as $Z_d=Z+Z_{min}$, analogous to the discussion above in calculating $Z_c$. Accordingly, the index values are generated as:

$$S_d = S + S_{min}$$

$$D_d = D + D_{min}$$

The $H_d$ index value is the code change risk 310 for the code change 108. This can be, for example, a most recently generated code change risk 310 for the code change 108.

These index values are generated at some interval, such as weekly. Accordingly, these index values are also referred to as periodic index values, and are used to generate the periodic repository risk value as discussed above. An overall developer risk value, which is the developer risk 314, is generated by averaging the periodic developer risk values.

The risk profile generation module 308 receives the code change risk 310, the repository risk 312, and the developer risk 314, and uses these to generate the risk profile 110. The risk profile 110 is generated at some interval, such as weekly or in response to a newly generated code change risk 310, repository risk 312, or developer risk 314. In one or more implementations, the risk profile generation module 308 generates the risk profile 110 by summing the code change risk 310, the repository risk 312, and the developer risk 314.

Additionally or alternatively, the risk profile generation module 308 can use the code change risk 310, the repository risk 312, and the developer risk 314 in different manners to generate the risk profile 110. For example, different weights can be applied to each of the risks 310, 312, and 314, allowing different ones of the risks 310, 312, and 314 to have a different effect on the risk profile 110 (e.g., the repository risk 312 may be weighted heavier to allow complexity of the code repository 106 to more heavily affect the risk profile 110). By way of another example, various rules or criteria can be applied to the risks 310, 312, 314 to determine the risk profile 110. E.g., if the repository risk 312 is high (e.g., above a threshold amount), and the developer risk 312 is high (e.g., because of a lack of peer review interactions), then the risk profile generation module 308 can set the risk profile 110 at a high level regardless of the code change risk 310.

By way of another example, the risk profile 110 may be all three of the code change risk 310, the repository risk 312, and the developer risk 314. This allows different functionality to be implemented in the quality control modules of different stages. E.g., at one stage the code change risk 310 may weigh more heavily than the repository risk 312 or the developer risk 314 in determining whether additional verification of the code change 108 is desired, whereas at another stage the repository risk 310 may weigh more heavily than the code change risk 310 or the developer risk 314 in determining whether additional verification of the code change 108 is desired.

As discussed above, the code change risk 310, the repository risk 312, the developer risk 314, and the risk profile 110 are generated at some interval, such as weekly. The generation of these risks is dynamic and operates as a feedback loop, continually changing the risks based on the various risk identification data 112. For example, the more a code change fails (e.g., a quality gate failure), the more the code change risk 310 increases and the developer risk 314 increases. Similarly, as the code change failures (e.g., quality gate failures) a developer has decreases over time, the developer risk 314 decreases over time.

Although specific examples of generating the periodic code change risk value, the repository risk value, and the development risk value, any of a variety of different algorithms or equations can be applied to generate each such risk value. For example, one or more of the periodic code change risk value, the repository risk value, and the development risk value can be generated using different index values than in the examples above. By way of another example, one or more of the periodic code change risk value, the repository risk value, and the development risk value can be generated by weighting different index values differently, weighting different data values used to generate an index value differently, and so forth.

Although particular functionality is discussed herein with reference to particular modules or systems, it should be noted that the functionality of individual modules or systems discussed herein can be separated into multiple modules or systems, that at least some functionality of multiple modules or systems can be combined into a single module or system, and so forth.

In one or more implementations, the risk profile generation system 102 provides a user interface displaying various information regarding the risks generated using the techniques discussed herein. This allows users (e.g., a manager of the code repository 106) to see various information regarding the repository risks for one or more code repositories, the code change risks for one or more code changes, and the developer risks for one or more developers over time.

Figure 4:
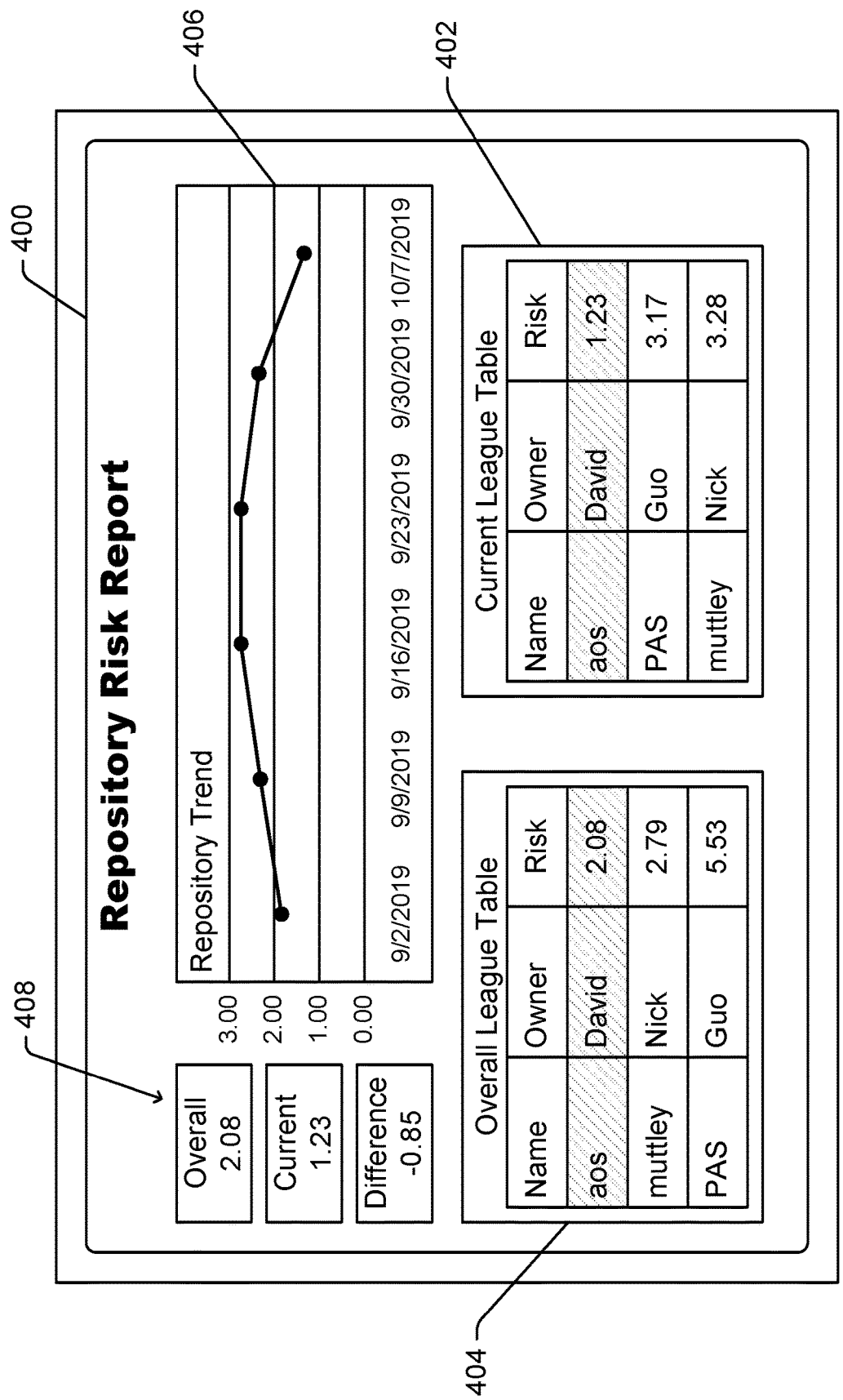
FIG. 4 illustrates an example user interface displaying various information regarding the repository risk.

FIG. 4 illustrates an example user interface 400 displaying various information regarding the repository risk. In the example of FIG. 4, the repository risk is generated weekly. A repository risk report includes a current league table portion 402 displays the name, owner, and most recently generated repository risk for each of multiple different code repositories. For example, a code repository named "aos" has an owner of "David" (e.g., the manager responsible for the code repository), and a current repository risk of 1.23. These values are illustrated with diagonal lines to indicate that the code repository named "aos" is the currently selected code repository. In one or more implementations, if a repository risk is not generated for a code repository in the current week (e.g., because there were no code changes deployed to the code repository) then the code repository is not included in the current league table portion 402.

An overall league table portion 404 displays the name, owner, and average generated repository risk for each of multiple different code repositories. For example, the code repository named "aos" has an owner of "David" (e.g., the manager responsible for the code repository), and an average repository risk of 2.08. These values are illustrated with diagonal lines to indicate that the code repository named "aos" is the currently selected code repository. A code repository can be selected in various manners, such as being clicked on with a cursor and cursor control device in either the overall league table portion 404 or the current league table portion 402, being touched with a finger or stylus in either the overall league table portion 404 or the current league table portion 402 when displayed on a touchscreen, audible input, and so forth.

It should be noted that although only three code repositories are illustrated in portions 402 and 404 that any number of code repositories can be included in portions 402 and 404.

A graph portion 406 illustrates the repository risk trend for the selected code repository. The repository risk generated each week is plotted in the graph portion 406 to display the repository risk trend. A summary portion 408 displays the current repository risk for the selected code repository, the average ("overall") repository risk for the selected code repository, and the difference between the current repository risk and the average repository risk for the selected code repository.

The user interface 400 provides an efficient display for information regarding the repository risks. This allows users to see the trend of the repository risk for various different code repositories and take appropriate action (e.g., pay closer attention to code changes to the code repository if the repository risk is too high or is trending higher).

Figure 5:
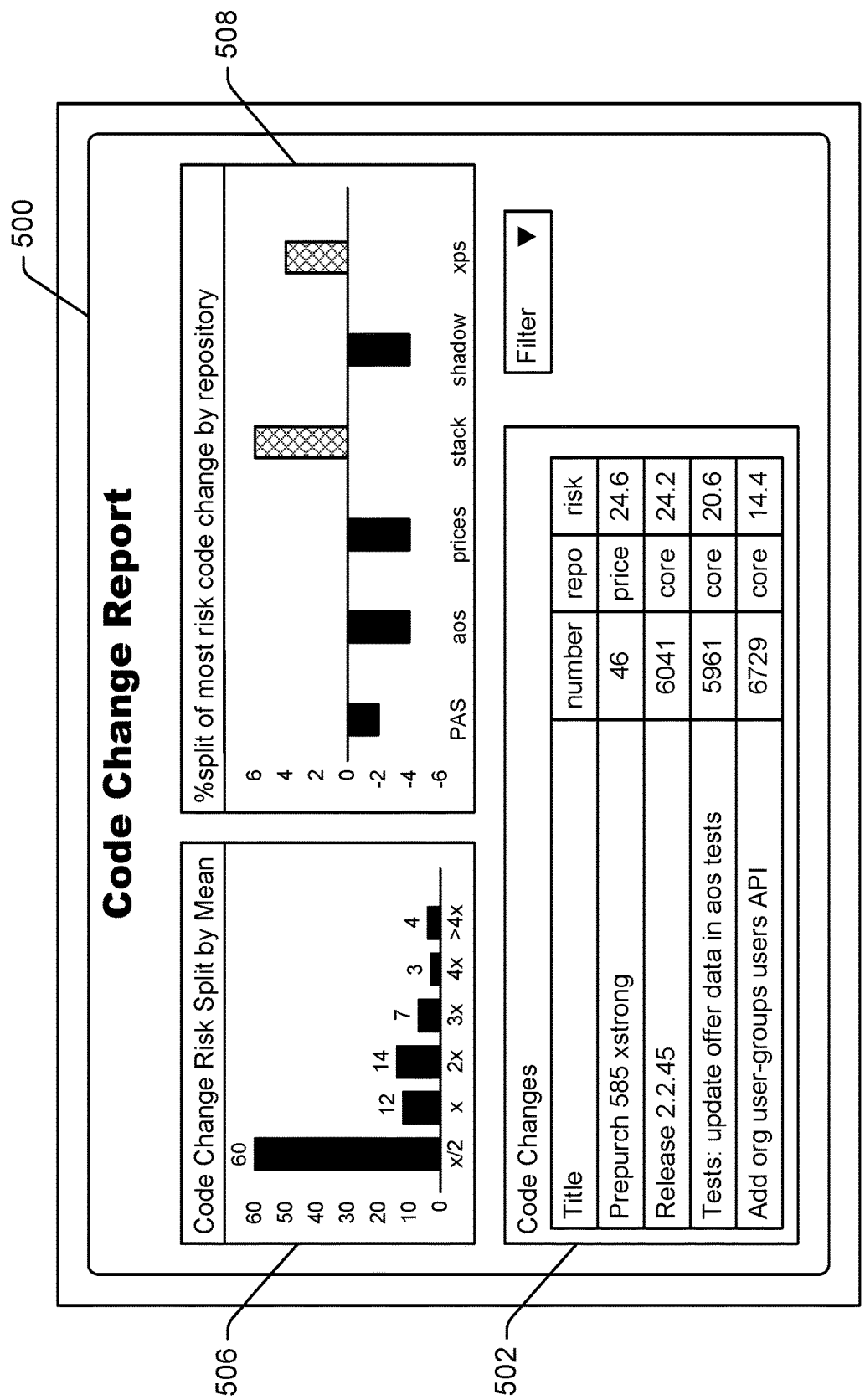
FIG. 5 illustrates an example user interface displaying various information regarding the code repository and code change risks for the code repository.

FIG. 5 illustrates an example user interface 500 displaying various information regarding the code repository and code change risks for the code repository. In the example of FIG. 5, the code change risk is generated weekly. A code change report includes a code changes portion 502 that displays the title, an identification number, a code repository that the code change is for, and the most recently generated code change risk for the code change for each of multiple code changes. For example, a code change with the title "Release 2.2.45" has an identification number of 6041, is a code change for the code repository named "core", and has a current code change risk of 24.2. It should be noted that although only four code repositories are illustrated in portion 502 that any number of code repositories can be included in portion 502.

Various filter criteria can optionally be applied to determine which code changes are included in the code changes portion 502, such as via a drop down menu 504. Examples of the filter criteria include recency criteria (e.g., the previous month or the previous six months), code repository criteria (e.g., so that code changes for only selected code repositories are displayed), title criteria (e.g., so that code changes for only titles matching the title criteria, including optionally wildcard values, are displayed), and so forth.

A code change risk split by mean portion 506 is a bar graph indicating how many code changes are in each of multiple ranges relative to the mean code change risk for the code changes in the code changes portion 502. For example, the bar graph in portion 506 indicates that 60% of the code change risks were less than half the mean, 12% of the code change risks were between half the mean and the mean, 14% of the code change risks were between the mean and twice the mean, 7% of the code change risks were between twice the mean and three times the mean, 3% of the code change risks were between three times the mean and four times the mean, and 4% of the code change risks were greater than four times the mean.

A risk split portion 508 indicates how much each code change in the code changes portion 502 impacts risk for a code repository. Multiple code changes are listed across the bottom of the portion (PAS, aos, prices, stack, shadow, and xps). Code changes illustrated with a solid bar positively impact the risk for a code repository (e.g., have a code change risk that is less than the mean code change risk for the code changes in the code changes portion 502). Code changes illustrated with crosshatching negatively impact the risk for a code repository (e.g., have a code change risk that is greater than the mean code change risk for the code changes in the code changes portion 502). The height of each solid bar and each crosshatched bar indicates how much the corresponding code change is impacting the risk for a code repository (e.g., how far the code change risk is above or below the mean code change risk). For example, the code change "stack" is negatively impacting the risk for a code repository more than the code change "xps" is negatively impacting the risk for the code repository.

The user interface 500 provides an efficient display for information regarding the code change risks, including which code changes are potentially causing the most trouble (having the most impact on the risk for the code repository) as well as how many code changes potentially contribute most to the risk for the code repository. For example, from portion 508 the user can readily ascertain that the code change "stack" is potentially causing more trouble than the code change "aos". By way of another example, from portion 506 the user can readily ascertain that there are four code changes that are potentially contributing the most to the risk for the code repository. This allows users to quickly identify the code change risks that are potentially causing the most trouble and take appropriate action (e.g., pay closer attention to code changes to the code repository if the repository risk is too high or is trending higher).

Figure 6:
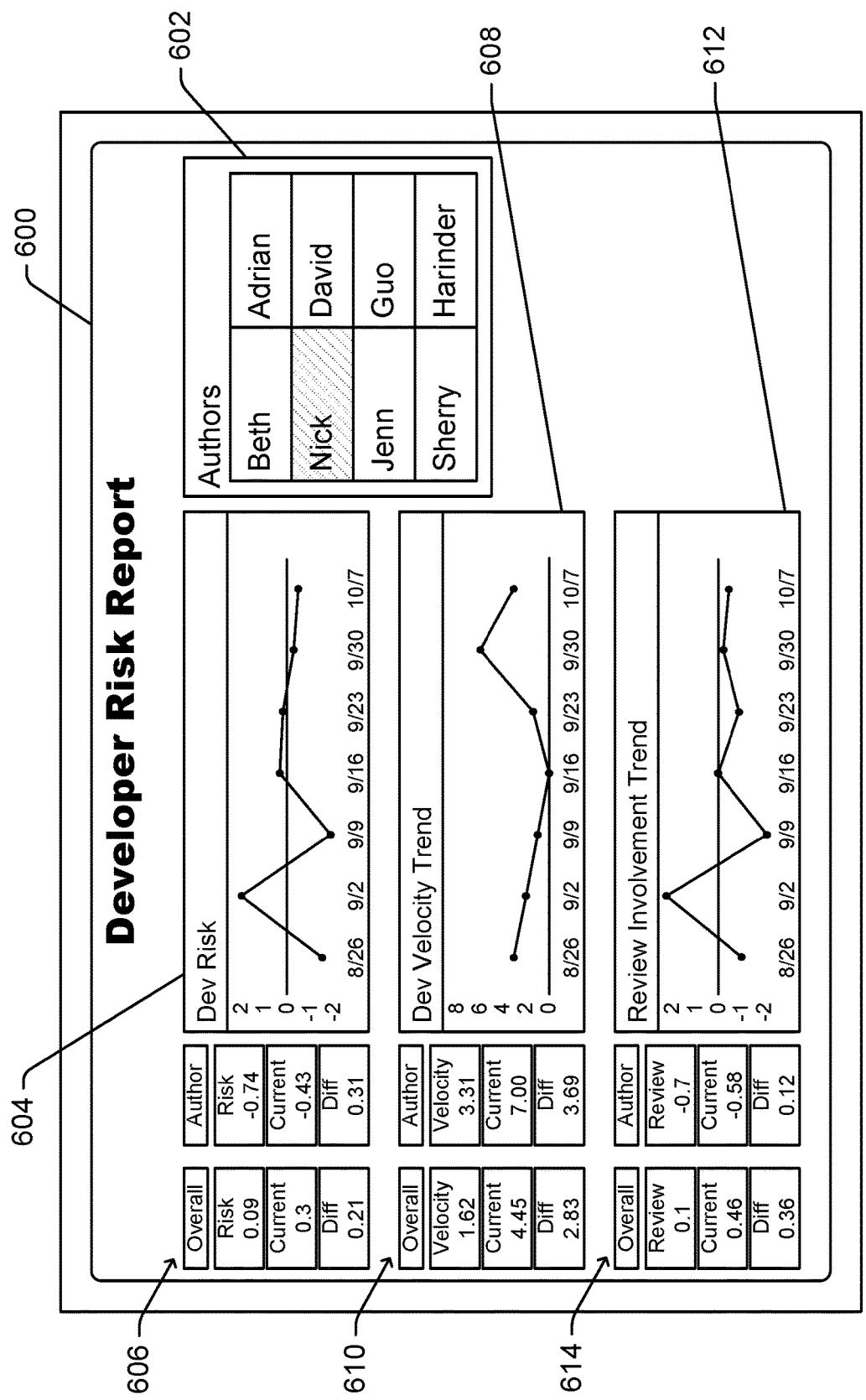
FIG. 6 illustrates an example user interface displaying various information regarding the developer risks.

FIG. 6 illustrates an example user interface 600 displaying various information regarding the developer risks. In the example of FIG. 6, the developer risk is generated weekly. A developer risk report includes an authors portion 602 that displays the names of the different developers that contribute code to a particular code repository. The developer named Nick is illustrated with diagonal lines to indicate the currently selected developer. A developer can be selected in various manners, such as being clicked on with a cursor and cursor control device, being touched with a finger or stylus when displayed on a touchscreen, audible input, and so forth. The remainder of the user interface 600 displays various information and trends regarding the selected developer. It should be noted that although only eight developers are illustrated in portion 602 that any number of developers can be included in portion 602.

A developer risk portion 604 is a graph illustrating the developer risk trend for the selected developer. For each week that the developer risk is generated, a developer value obtained by subtracting the repository risk from the current developer risk is plotted in the graph portion 604 to display the developer risk trend. A summary portion 606 displays in the "author" column an average developer value ("risk") for the selected developer, the current developer value ("current") for the selected developer, and the difference between the average developer value and the current developer value for the selected developer. The summary portion 606 also displays in the "overall" column an average developer value ("risk") for all the developers in portion 602, the current average developer value ("current") for all the developers in portion 602, and the difference between the average developer value and the current average developer value for all the developers in portion 602.

A developer velocity trend portion 608 is a graph illustrating the number of code changes merged into the code repository over a given time period (e.g., one week) for the selected developer. Each time period, the number of code changes that the selected developer merged into the code repository is plotted in the graph portion 608 to display the developer velocity (number of code changes) trend. A summary portion 610 displays in the "author" column an average number of merged code changes ("velocity") for the selected developer, the current number of merged code changes ("current") for the selected developer, and the difference between the average number of merged code changes and the current number of merged code changes for the selected developer. The summary portion 610 also displays in the "overall" column an average number of merged code changes ("velocity") for all the developers in portion 602, the current average number of merged code changes ("current") for all the developers in portion 602, and the difference between the average number of merged code changes and the current average number of merged code changes in portion 602.

A review involvement trend portion 612 is a graph illustrating the review involvement trend over a given time period (e.g., one week) for the selected developer. Each time period, a review value is obtained by subtracting the average number of peer reviews provided by all the developers in portion 602 over the time period (e.g., the past week) from the number of peer reviews provided by the selected developer over the time period (e.g., the past week). This review value is plotted in the graph portion 612 to display the developer review involvement trend. A summary portion 614 displays in the "author" column an average review value ("review") for the selected developer, the current review value ("current") for the selected developer, and the difference between the average developer review value and the current developer review value for the selected developer. The summary portion 614 also displays in the "overall" column an average review value ("review") for all the developers in portion 602, the current average review value ("current") for all the developers in portion 602, and the difference between the average review value and the current average review value for all the developers in portion 602.

The user interface 600 provides an efficient display for information regarding the developer risks. This includes the developer risk trend (relative to the repository risk), the developer velocity trend, and the developer's review involvement trend. For example, from portion 604 the user can readily ascertain that the selected developer's developer risk was approximately the same as the repository risk from 9/16 through 10/7. By way of another example, from portion 608 the user can readily ascertain that the merged code changes by the selected developer were declining 8/26 through 9/16, and then increased. This allows users to quickly identify trends of each developer and take appropriate action (e.g., pay closer attention to or add tests to stages of the automated code deployment pipeline for a developer whose developer risk is trending higher).

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-11.

Figure 7:
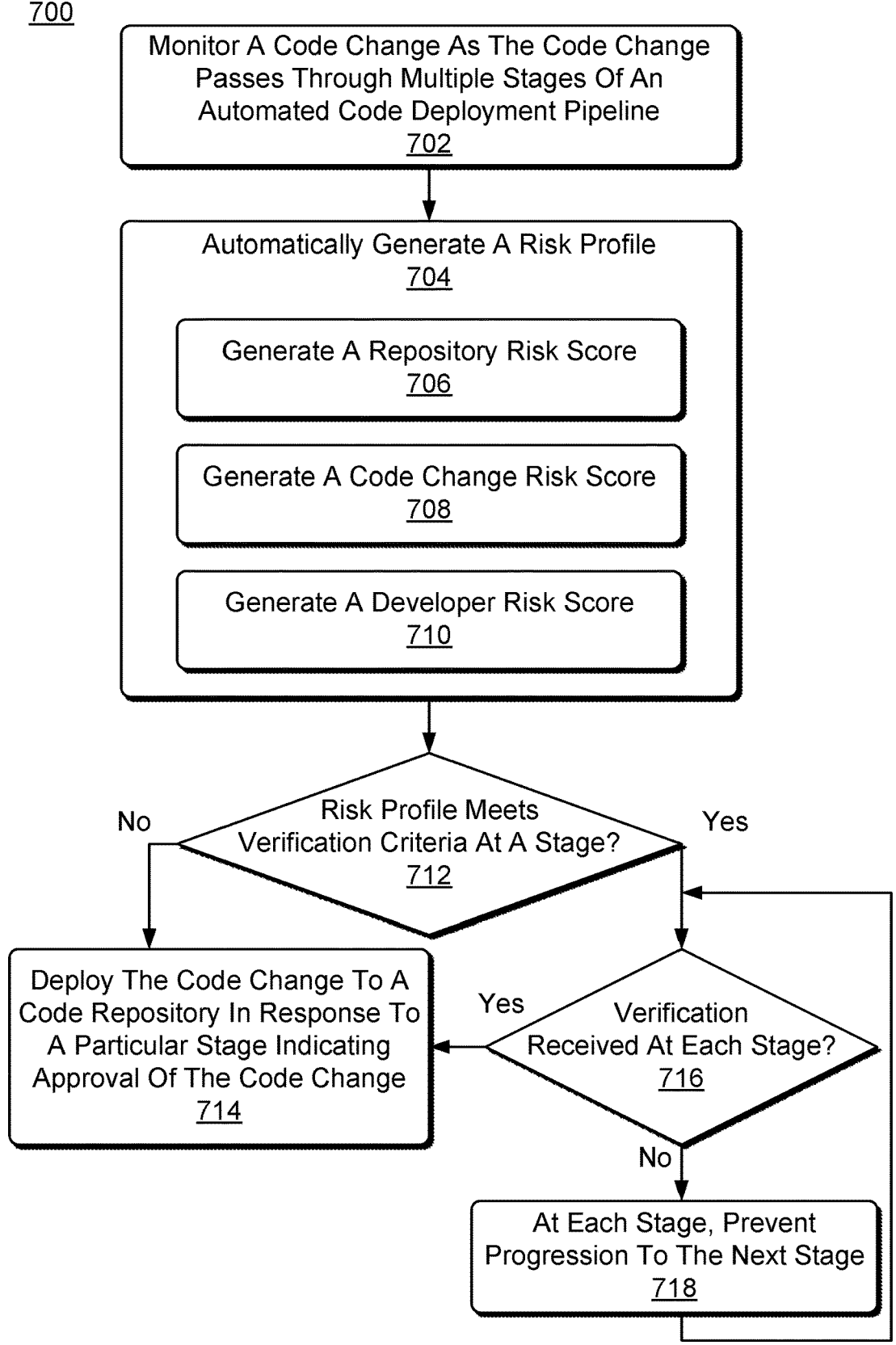
FIG. 7 is a flow diagram depicting a procedure in an example implementation of automated code testing for code deployment pipeline based on risk determination.

FIG. 7 is a flow diagram depicting a procedure in an example 700 implementation of automated code testing for code deployment pipeline based on risk determination. In this example, a code change to a code repository is monitored as the code change passes through multiple stages of an automated code deployment pipeline (block 702). This monitoring includes collecting data regarding the code repository and data regarding the code change.

A risk profile, based on a repository risk score as well as a code change risk score and a developer risk score, is automatically generated for the code change (block 704).

The risk profile identifies a risk of making the code change based on the code change itself as well as a reputation of the individual providing the code change. Generating the risk profile includes generating a repository risk score indicating a collection of historical outcomes of code submissions to the code repository and data that identifies further risk (block 706), generating a code change risk score indicating a history of the code change as it progresses through the automated code deployment pipeline (block 708), and generating a developer risk score indicating a collection of historical outcomes of code submissions by the developer to at least the code repository (710).

A determination is made as to whether the risk profile meets verification criteria at a stage (block 712). This determination can be made in various manners as discussed above. This additional verification refers to verification in addition to any tests or review typically performed at the stage.

If the risk profile does not meet the verification criteria, the code change is deployed to the code repository in response to a particular stage of the multiple stages indicating approval of the code change (block 714). This particular stage is typically a final stage of the multiple stages, although can alternatively be a different stage.

However, if the risk profile meets the verification criteria, then a check is made at each stage for which the risk profile meets the verification criteria, whether the desired additional verification is received (block 716). At each stage, progression of the code change to the next stage is prevented (block 718) until the desired additional verification is received. After the code change has progressed through the stages of the automated code deployment pipeline, including stages where additional verification is desired, and the particular stage of the multiple stages indicates approval of the code change, the code change is deployed to the code repository (block 714).

Example System and Device

Figure 8:
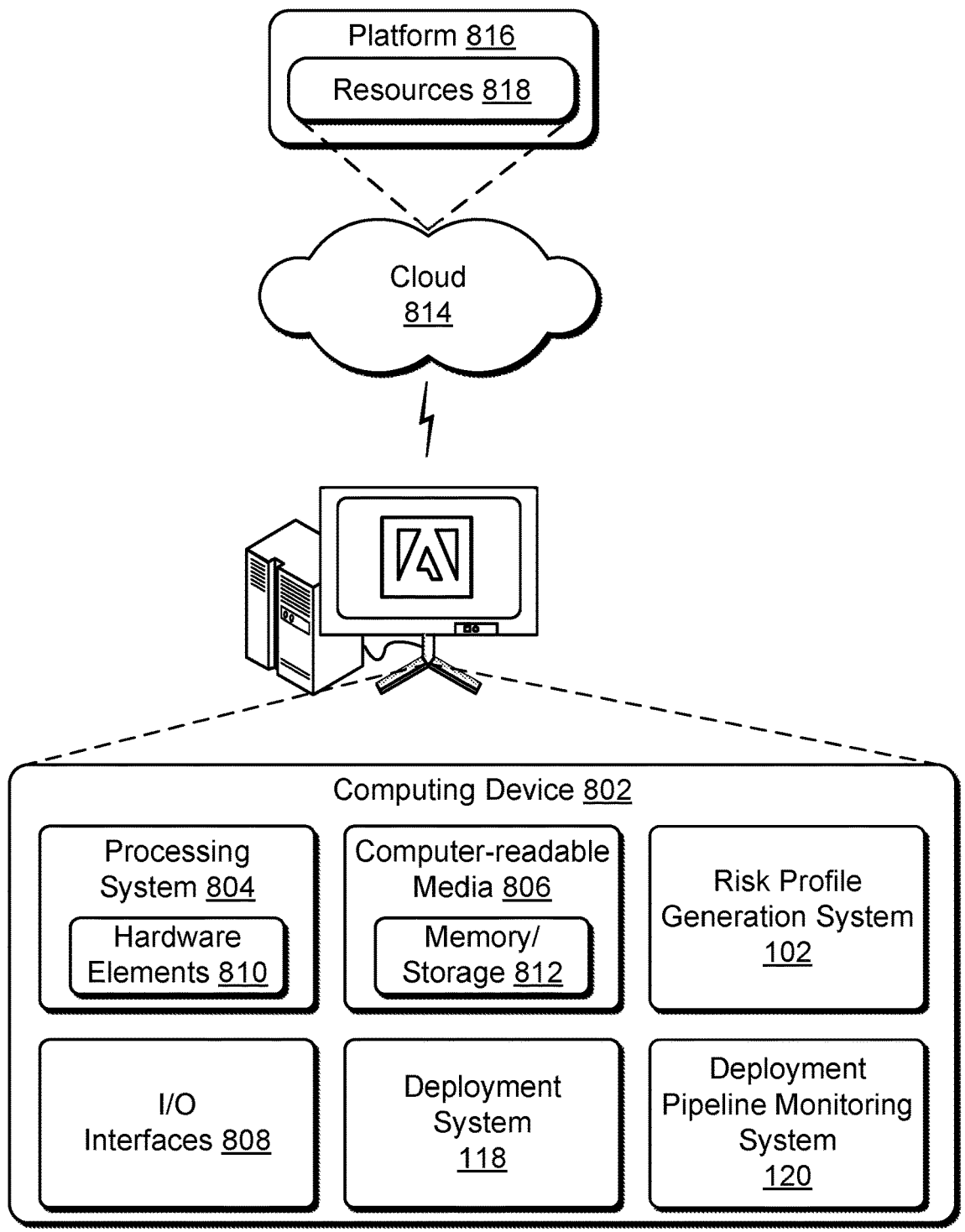
FIG. 8 illustrates an example system including various components of an example device that can be implemented as any type of computing device as described or utilized with reference to FIGS. 1-7 to implement aspects of the techniques described herein.

FIG. 8 illustrates an example system generally at 800 that includes an example computing device 802 that is representative of one or more computing systems or devices that may implement the various techniques described herein. This is illustrated through inclusion of the risk profile generation system 102, the deployment system 118, and the deployment pipeline monitoring system 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for monitoring code changes in a multistage automated code deployment pipeline, the method comprising:
generating a repository risk score based on a collection of historical outcomes of code submissions to a code repository and additional data describing the code repository;
generating a code change risk score based on a history of a code change in the code repository including a ratio of a number of times the code change has failed to a number of times the code change successfully passed a stage in the multistage automated code deployment pipeline, a number of lines of code in the code repository that are changed by the code change, an age of the code change, a number of quality gate failure exceptions given for the code change, and how many code changes a developer of the code change has merged with the code repository;
generating a developer risk score based on a collection of historical outcomes of code submissions by the developer;
determining a risk profile for the code change based on the repository risk score, the code change risk score, and the developer risk score;
determining whether the risk profile meets a verification criteria; and
preventing, in response to determining that the risk profile meets the verification criteria, the code change from progressing to a next stage in the multistage automated code deployment pipeline.

2. The method as recited in claim 1, further comprising:
receiving additional verification for the code change; and
releasing, in response to receiving the additional verification, the code change to the next stage in the multistage automated code deployment pipeline.

3. The method as recited in claim 2, the additional verification for the code change comprising verification of the code change by a particular individual or an individual with a particular position.

4. The method as recited in claim 2, the additional verification for the code change comprising at least one additional test result indicating that the code change can be approved.

5. The method as recited in claim 1, further comprising deploying the code change to the code repository.

6. The method as recited in claim 1, the generating the code change risk score comprising:
generating a repository risk index value based on standardizing data indicating the number of lines of code in the code repository that are changed by the code change;
generating a failure index value based on standardizing the ratio of the number of times the code change has failed to the number of times the code change successfully passed the stage in the multistage automated code deployment pipeline;
generating an age index value based on standardizing data indicating the age of the code change;
generating an exception index value based on standardizing data indicating the number of quality gate failure exceptions given for the code change;
generating a coverage index value based on standardizing data indicating how many code changes the developer of the code change has merged with the code repository; and
summing the repository risk index value, the failure index value, the age index value, the exception index value, and the coverage index value.

7. The method as recited in claim 1, the repository risk score being based on the number of lines of code in the code repository that are changed by the code change, the ratio of the number of times the code change has failed to the number of times the code change successfully passed the stage in the multistage automated code deployment pipeline, the age of the code change, the number of quality gate failure exceptions given for the code change, how many code changes the developer of the code change has merged with the code repository, a number of files in the code repository that are changed by the code change, and a number of developers that have contributed code to the code repository.

8. The method as recited in claim 7, the generating the repository risk score comprising:
generating a repository risk index value based on standardizing data indicating the number of lines of code in the code repository that are changed by the code change;
generating a failure index value based on standardizing data indicating the ratio of the number of times the code change has failed to the number of times the code change successfully passed the stage in the multistage automated code deployment pipeline;
generating an age index value based on standardizing data indicating the age of the code change;
generating an exception index value based on standardizing data indicating the number of quality gate failure exceptions given for the code change;
generating a coverage index value based on standardizing data indicating how many code changes the developer of the code change has merged with the code repository;
generating a file index value based on standardizing data indicating the number of files in the code repository that are changed by the code change;
generating a developers index value based on standardizing data indicating the number of developers that have contributed code to the code repository; and
summing the repository risk index value, the failure index value, the age index value, the exception index value, the coverage index value, the file index value, and the developers index value.

9. The method as recited in claim 1, the developer risk score being based on a number of code changes the developer has merged with the code repository, the code change risk score, and a developer risk score for each of one or more peer reviewers of the code change.

10. A method for monitoring code changes in a multistage automated code deployment pipeline, the method comprising:
generating a repository risk score based on a collection of historical outcomes of code submissions to a code repository and additional data describing the code repository;
generating a code change risk score based on a history of a code change in the code repository;
generating a developer risk score based on a collection of historical outcomes of code submissions by a developer that submitted the code change, the generating the developer risk score including generating a coverage index value based on standardizing data indicating a number of code changes the developer has merged with the code repository, generating a peer index value based on standardizing data indicating the developer risk for each of one or more peer reviewers of the code change, and summing the coverage index value, the peer index value, and the code change risk score;
determining a risk profile for the code change based on the repository risk score, the code change risk score, and the developer risk score;
determining whether the risk profile meets a verification criteria; and
preventing, in response to determining that the risk profile meets the verification criteria, the code change from progressing to a next stage in the multistage automated code deployment pipeline.

11. The method as recited in claim 1, the generating the risk profile comprising adding together the repository risk score, the code change risk score, and the developer risk score.

12. A computing device for monitoring code changes in a multistage automated code deployment pipeline, the computing device comprising:
a processor; and
computer-readable storage media having stored thereon multiple instructions that, responsive to execution by the processor, cause the processor to perform operations including:
generating a repository risk score based on a collection of historical outcomes of code submissions to a code repository and additional data describing the code repository including a number of files in the code repository that are changed by a code change, a number of lines of code in the code repository that are changed by the code change, a ratio of a number of times the code change has failed to a number of times the code change successfully passed a stage in the multistage automated code deployment pipeline, an age of the code change, a number of quality gate failure exceptions given for the code change, how many code changes a developer of the code change has merged with the code repository, and a number of developers that have contributed code to the code repository;
generating a code change risk score based on a history of the code change in the code repository;

generating a developer risk score based on a collection of historical outcomes of code submissions by the developer;

determining a risk profile for the code change based on the repository risk score, the code change risk score, and the developer risk score;

determining whether the risk profile meets a verification criteria; and allowing the code change to progress to a next stage in the multistage automated code deployment pipeline only in response to receipt of additional verification of the code change.

13. The computing device as recited in claim 12, the code change risk score being based on the number of lines of code in the code repository that are changed by the code change, the ratio of a number of times the code change has failed to a number of times the code change successfully passed a stage in the multistage automated code deployment pipeline, the age of the code change, the number of quality gate failure exceptions given for the code change, and how many code changes the developer of the code change has merged with the code repository.

14. The computing device as recited in claim 12, the developer risk score being based on a number of code changes the developer has merged with the code repository, the code change risk score, and the developer risk score for each of one or more peer reviewers of the code change.

15. The computing device as recited in claim 12, the additional verification comprising additional verification of the code change by a particular individual or an individual with a particular position, or a test result from at least one additional test indicating that the code change can be approved.

16. A system comprising:
a deployment pipeline monitoring system to monitor a code change in a multistage automated code deployment pipeline, wherein the deployment pipeline monitoring system is to identify a number of lines of code in a code repository that are changed by the code change, a ratio of a number of times the code change has failed to a number of times the code change successfully passed a stage in the multistage automated code deployment pipeline, an age of the code change, a number of quality gate failure exceptions given for the code change, a number of files in the code repository that are changed by the code change, and a number of developers that have contributed code to the code repository;

means for automatically generating a risk profile for the code change based on a collection of historical outcomes of code submissions to the code repository, a history of the code change in the code repository, a collection of historical outcomes of code submissions by a developer that submitted the code change, how many code changes the developer of the code change has merged with the code repository, the number of lines of code in the code repository that are changed by the code change, the ratio of the number of times the code change has failed to the number of times the code change successfully passed the stage in the multistage automated code deployment pipeline, the age of the code change, the number of quality gate failure exceptions given for the code change, the number of files in the code repository that are changed by the code change, and the number of developers that have contributed code to the code repository; and a quality control module included in a stage in the multistage automated code deployment pipeline to determine whether the risk profile meets a verification criteria, and preventing, in response to determining that the risk profile meets the verification criteria, the code change from progressing to a next stage in the multistage automated code deployment pipeline.

17. The system as recited in claim 16, wherein the deployment pipeline monitoring system is further to identify a number of code changes the developer has merged with the code repository, and the risk profile being based on the number of code changes the developer has merged with the code repository and a developer risk for each of one or more peer reviewers of the code change.

18. The method as recited in claim 10, the code change risk score being based on a number of lines of code in the code repository that are changed by the code change, a ratio of a number of times the code change has failed to a number of times the code change successfully passed a stage in the multistage automated code deployment pipeline, an age of the code change, a number of quality gate failure exceptions given for the code change, and how many code changes the developer of the code change has merged with the code repository.

19. The method as recited in claim 10, the repository risk score being based on a number of lines of code in the code repository that are changed by the code change, a ratio of a number of times the code change has failed to a number of times the code change successfully passed a stage in the multistage automated code deployment pipeline, an age of the code change, a number of quality gate failure exceptions given for the code change, how many code changes the developer of the code change has merged with the code repository, a number of files in the code repository that are changed by the code change, and a number of developers that have contributed code to the code repository.

20. The method as recited in claim 10, further comprising:
receiving additional verification for the code change; and
releasing, in response to receiving the additional verification, the code change to the next stage in the multistage automated code deployment pipeline.

* * * * *